United States Patent [19]
Sekerich

[11] Patent Number: 5,921,169
[45] Date of Patent: Jul. 13, 1999

[54] AUTOMATIC BAKING APPARATUS

[75] Inventor: Michael Sekerich, Spring Valley, N.Y.

[73] Assignee: China Pacific Trade Ltd., Virgin Islands (Br.)

[21] Appl. No.: 08/774,727

[22] Filed: Jan. 3, 1997

[51] Int. Cl.$^6$ .............................. A21B 1/00; A21D 8/00; A47J 27/00; A47J 37/01
[52] U.S. Cl. ................................................ 99/348; 99/426
[58] Field of Search ...................... 99/348, 426; 220/409; 494/26.5, 27.1, 32

[56] References Cited

U.S. PATENT DOCUMENTS

| 4,677,906 | 7/1987 | Lowe | 99/426 X |
| 5,404,800 | 4/1995 | Hsu | 99/426 |

*Primary Examiner*—Reginald L. Alexander
*Attorney, Agent, or Firm*—Burns, Doane, Swecker & Mathis, L.L.P.

[57] ABSTRACT

An improved low-cost and high efficiency automatic baking apparatus for bread or cake having a non-removable baking container in which there is provided a stirring blade for ingredients mixing or dough kneading, the baked product can be retrieved from the baking container by a retrieving device which has a base portion and an arm portion, the base portion is placed below the stirring-blade and is adapted to receive the bulk of the baked product, part of the arm portion is exposed from the baked product so that the base portion can be removed by lifting the exposed portion of the handle, significant reduction in material and process costs is obtained since the built-in baking container eliminate the need of an extra shielding wall between the baking container and the heating elements.

15 Claims, 4 Drawing Sheets

AUTOMATIC BAKING APPARATUS

FIELD OF THE INVENTION

The present invention relates to an automatic baking apparatus, and more particularly to an improved low-cost automatic thermal baking apparatus having a non-removable baking container for making bread, cake or the like.

BACKGROUND OF THE INVENTION

Home-made oven-fresh cakes and breads are something that are greatly appreciated. Apart from the actual gastronomical experience, the progress of baking is instructive to children. However, making a home-baked product in the traditional way often means a lot of effort before and after baking and sometimes uncertain results.

Modern technology has come to assistance by offering automatic baking machine which produce baked products by simply having all the ingredients put together into a single machine, the rest of the process will then be taken care of by the machine. With such machines, a cake will be table-ready with minimal effort some time after ingredients are introduced into the machine. However, currently available automatic baking machines have shortcomings that have hindered their optimum performance.

A fully automatic baking machine usually comprises a main housing having internal and external circumferential walls between which electric heating elements, motor driving means and other electronic components are mounted. The baking chamber inside which the actual baking is performed is usually defined by the enclosure formed between the internal circumferential wall and a top lid for covering the main housing.

Similar to traditional cooking wares, the baking container for this type of baking machine usually has a substantially U-shaped cross section. The U-shaped container together means that if the baked product is to be removed with minimal shape distortion, the removal is best done by turning the baking container up-side down so that the baked product can be removed by gravity.

While most baking containers nowadays are manufactured with a non-stick coating, sticking of the baked product to the walls of the baking container does sometimes occur and it is not unusual that a scraper type tool is needed to help removing it. However, scraping inevitably causes scratches to the coating and would result in further aggravation of the damage to the non-stick coating, thus running into a vicious circle.

Furthermore, automatic baking machines are almost invariably provided with a stirring-blade for ingredient mixing or dough kneading. This stirring-blade is usually mounted at the bottom of the baking container and is connected to a motor driving means mounted on the main housing of the machine via coupling means. When baking is complete, this stirring-blade will usually become entrenched inside the body of the baked product. Such entrenchment usually makes it more difficult to remove the baked product without damaging its shape.

To avoid frequent disturbances of the electrical and electronic arrangements within the baking machine so that the service life of a machine would not be unduly shortened, most machines are therefore provided with a removable baking container which can be lifted out of the baking machine for cleaning and product removal.

Baking machines having a removable baking container invariably have an internal circumferential wall enclosing the baking chamber. This internal wall is usually made of a heat conductive material and is provided mainly for safety reasons so that a user will not be burnt or electrocuted due to accidental contact with the heating elements. This shielding wall also helps to prevent foreign matter from being caught by the heating elements and causing fire hazards.

However, such an internal wall means extra materials and higher costs which could have been saved if a baking machine having no shielding wall between the baking container and the heating elements can be provided. This is of course presupposed by a deign which is capable of resolving, or, at least mitigating, the above problems of removal of the baked product.

A further advantage of such a baking machine is the improvement of energy efficiency since the baking container wall and the internal wall of the main housing are now combined into one piece, air gaps between the container wall and the internal wall are no longer present and heat energy can therefore be transmitted more effectively to the baking container.

SUMMARY OF THE INVENTION

According to the present invention, there is provided an automatic baking apparatus having a main housing and a non-removable baking container, wherein inside the main housing there are provided heating means, motor driving means and control means and inside the non-removable baking container there are provided stirring means and retrieving means, wherein said stirring means comprises a stirring-blade member which is engageable with said motor driving means for causing motion of said stirring-blade, said retrieving means is provided for removing the baked product from said baking container and comprises a base portion and an arm portion, said base portion being adapted to be placed below said stirring-blade member and said arm portion being accessible from outside the body of said baked product.

Preferably, said heating elements are attached to said baking container.

Preferably the base portion of the above apparatus comprises an aperture which is adapted to allow passage of the driving shaft of said stirring-blade member through said base portion.

In an alternate preferred embodiment of the above apparatus, the said base portion comprises an aperture which is adapted to allow passage of said stirring-blade member through said base portion.

Preferably, the base portion of the apparatus comprises a rigid member extending from one side of said baking container, passing through the under-side of said stirring-blade member and reaching the other side of said baking container.

Preferably, the rigid member of the above base portion is in the form of a net, mesh, plate, grille, slotted plate or the like.

Preferably, the said base portion and said arm portion are connected by a hinged joint.

Preferably, the said arm portion comprises an elongated member which substantially extends from said base portion, along the wall of said baking container and beyond the top edge of said baking container.

According to another aspect of the present invention, there is provided a retrieving device for an automatic baking apparatus, comprising base and arm portions, wherein said base portion comprises a rigid member which in use extends from one side of the baking container of said apparatus, passing through the under-side of a stirring-blade member inside said container, and reaching the other side of said baking container, and said arm portion comprises a member which extends from said base portion towards the open end of said baking container.

Preferably the said base portion of the above retrieving device comprises an aperture which is adapted to allow passage of a driving shaft of said stirring-blade member through said base portion.

In an alternate preferred embodiment of the retrieving device, the said base portion comprises an aperture which is adapted to allow passage of said stirring-blade member through said base portion.

Preferably, said base portion comprises a rigid member which is in the form of a net, mesh, plate, grille, slotted plate or the like.

BRIEF DESCRIPTION OF THE DRAWINGS

The present invention will now be illustrated and explained by way of examples and with reference to the accompanying drawings, in which.

DETAILED DESCRIPTION OF THE PREFERRED EMBODIMENTS

Figure 1:
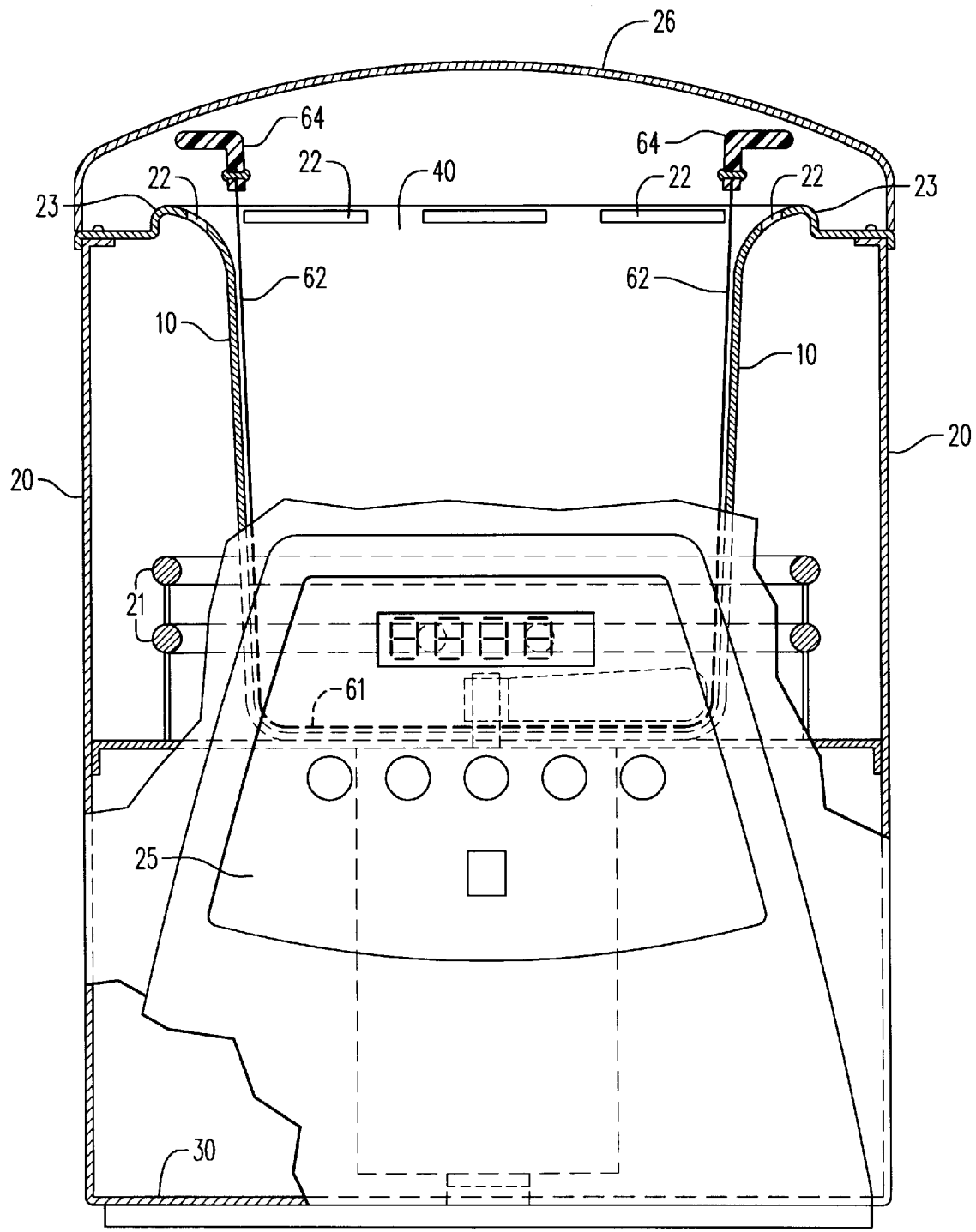
FIG. 1 shows a partly sectioned front view of a baking machine embodiment of the present invention.

Referring to the Figures there is shown a preferred embodiment of an automatic baking apparatus of the present invention. This apparatus 1 comprises a main housing having internal 10 and external 20 peripheral walls together with a base 30. Inside the main housing there is mounted a non-removable baking container 40. This baking container 40 is preferably made of a heat conductive material such as steel or aluminium and its internal surfaces are preferably coated with a non-stick and heat-resistive coating.

Since this baking container 40 is not designed to be removed after each baking, the peripheral walls of the baking container can therefore at the same time serve the purposes and functions of the internal walls which are found in conventional baking machines. The term "non-removable baking container" in the present context means a baking container which is not intended to be removed for each baking, but is of course removable for service or other maintenance purposes.

Inside the baking container 40 and for example at the bottom, there is provided a rotatable stirring-blade member 41 for mixing cake ingredients or for kneading bread dough. This rotatable blade 41 can be a single-blade design which extends from one side of the axis of rotation or a multi-blade design. Preferably the spatial coverage of this stirring blade in rotation is substantially equal to the whole base area of the baking container to assure effective and thorough mixing and kneading, an essential part of good baking.

Figure 2:
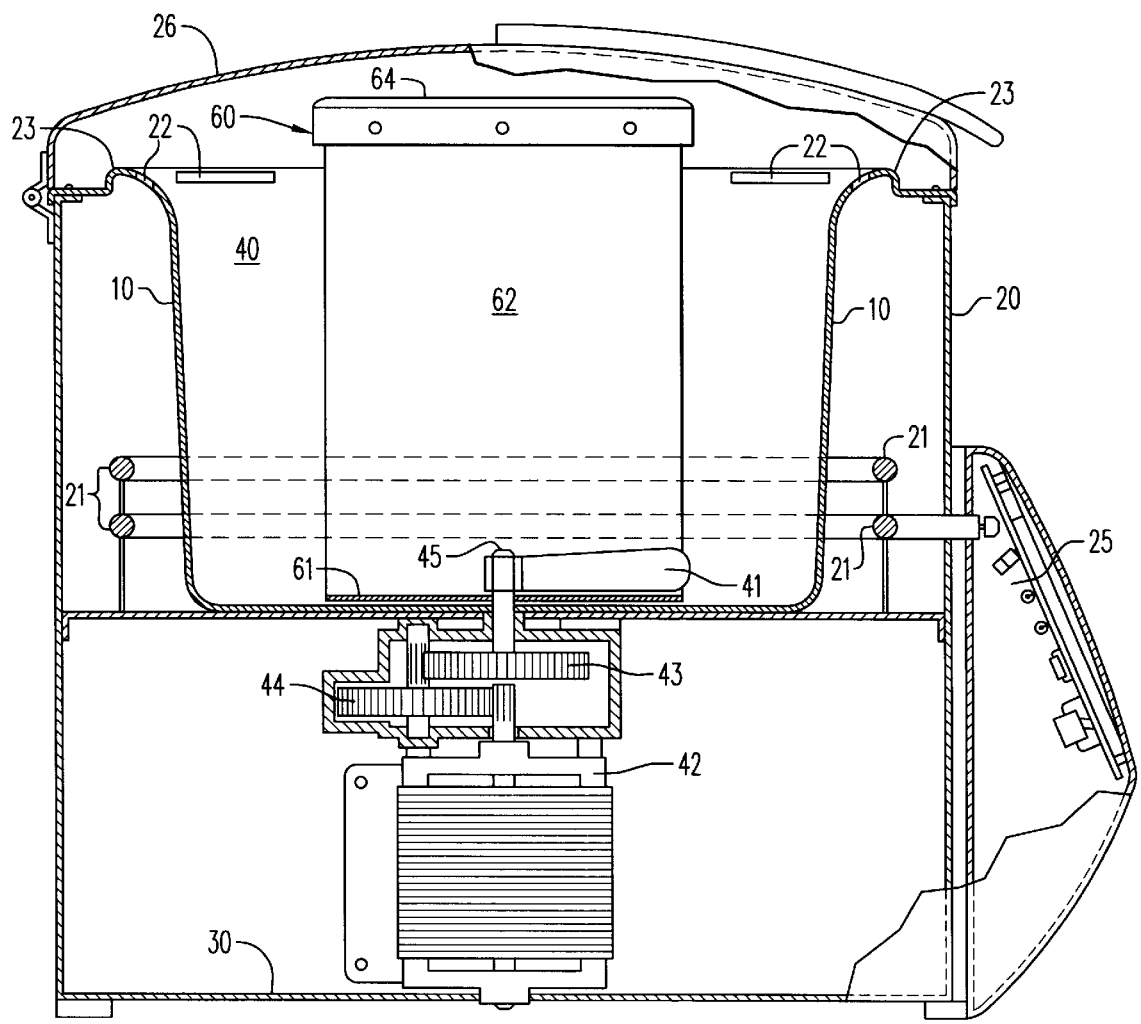
FIG. 2 shows a partly sectioned side view of the embodiment of FIG. 1.

A blade driving mechanism is mounted on the base of the main housing and is shown in particular in FIG. 2. This blade driving mechanism comprises an electric motor 42 which drives a set of speed reduction gears 43, 44. These gears in turn drive the stirring-blade 41 through a coupling means which engage the shaft 45 of the gear to the stirring-blade. The speed reduction gears are preferably made of a polymeric material in order to minimise vibrational noise during motor and gear rotation. Speed reduction gears are usually required since an optimum speed for mixing cake ingredients is between 80–120 RPM which is much lower than the speed of most small electric motors suitable for home appliances.

Heating for the present embodiment can for example be provided by conventional electric heating sources such as conventional resistive coils. Referring to FIG. 1, the baking container is surrounded by a plurality of heating elements 21 which are distributed along its depth, thereby producing adequate heat for baking when the elements are activated. As the baking container is not normally detachable from the main housing, heating element of many different configurations can be attached directly to the exterior wall of the baking chamber, making possible more uniform, efficient and faster bread-making.

Since the heating elements are enclosed within the main housing and between its external circumferential wall and the baking container, trapping of heat energy within that space would to some extent also improves baking quality since a more even heating environment would be produced.

Figure 3:
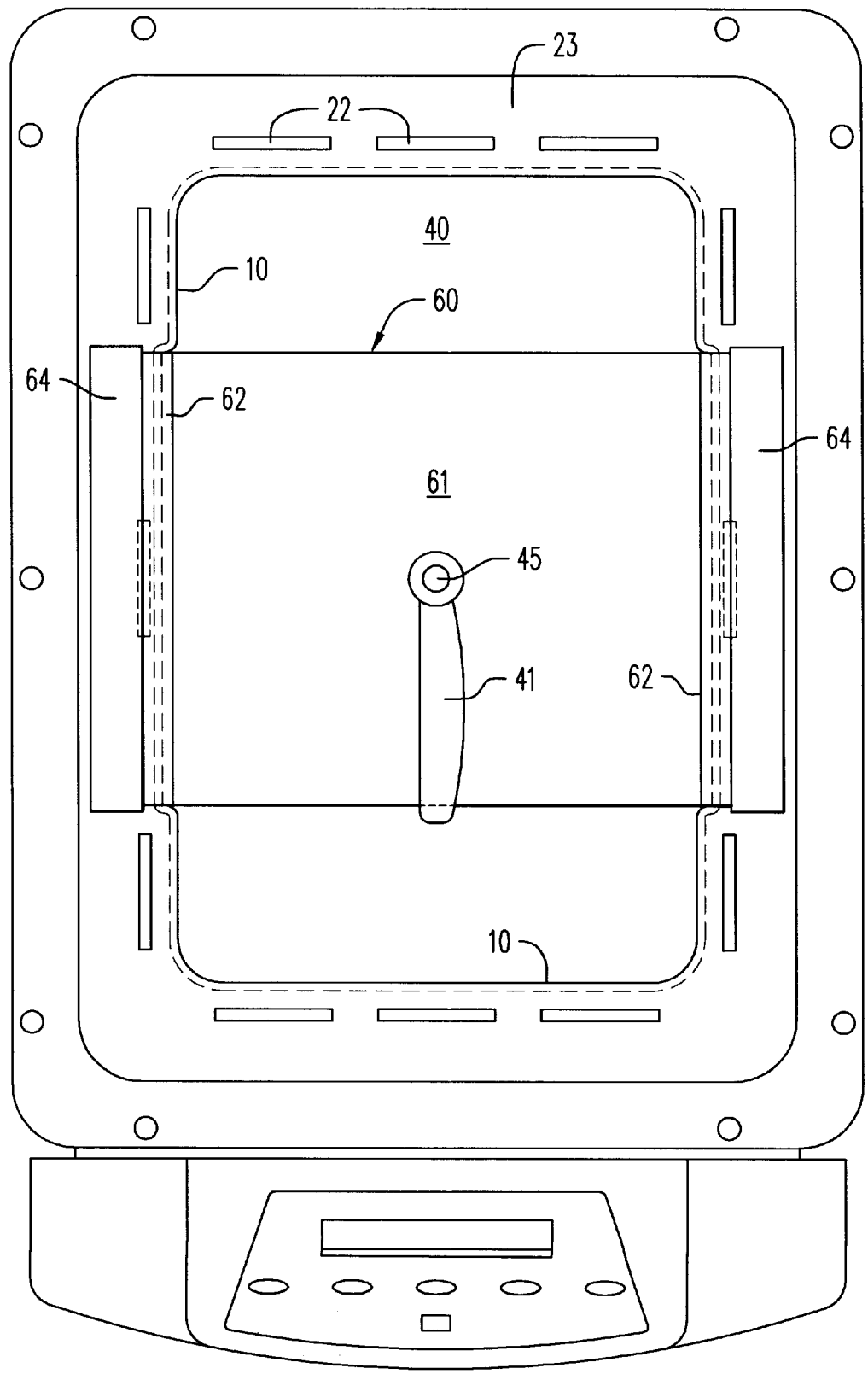
FIG. 3 shows a top view of the embodiment of FIG. 1.

Referring to FIG. 3 there are shown a plurality of venting apertures 22 which are distributed along the collar 23 formed between the top edge of the baking container and the external wall of the main housing. These venting apertures 22 are provided so that hot air produced by the heating elements 21 can reach and circulate in the space above the baking container, thereby providing the top part of the baking container with adequate baking. Loss of hot air is largely prevented by a top-lid 26 which covers the main housing.

To minimise adverse influence of the heating elements 21 to the control and timing devices or other electronic components, these devices are accommodated inside a compartment 25 which is formed as an attachment to the external peripheral wall of the main housing. As the compartment for housing the electronic components is substantially detached from the external peripheral wall, the temperature inside the compartment is therefore considerably lower than that around the heating elements 21 and the thermal requirement of the components are less stringent, thereby reducing component costs, extending machine life and benefiting the ultimate consumers.

To enable a baked product to be removed from a non-detachable baking container without turning the whole apparatus up-side down or using a scraper and without distorting the shape of a baked product, there is provided in the present invention a retrieving device 60 for removing baked product from the automatic baking machine.

Figure 4:
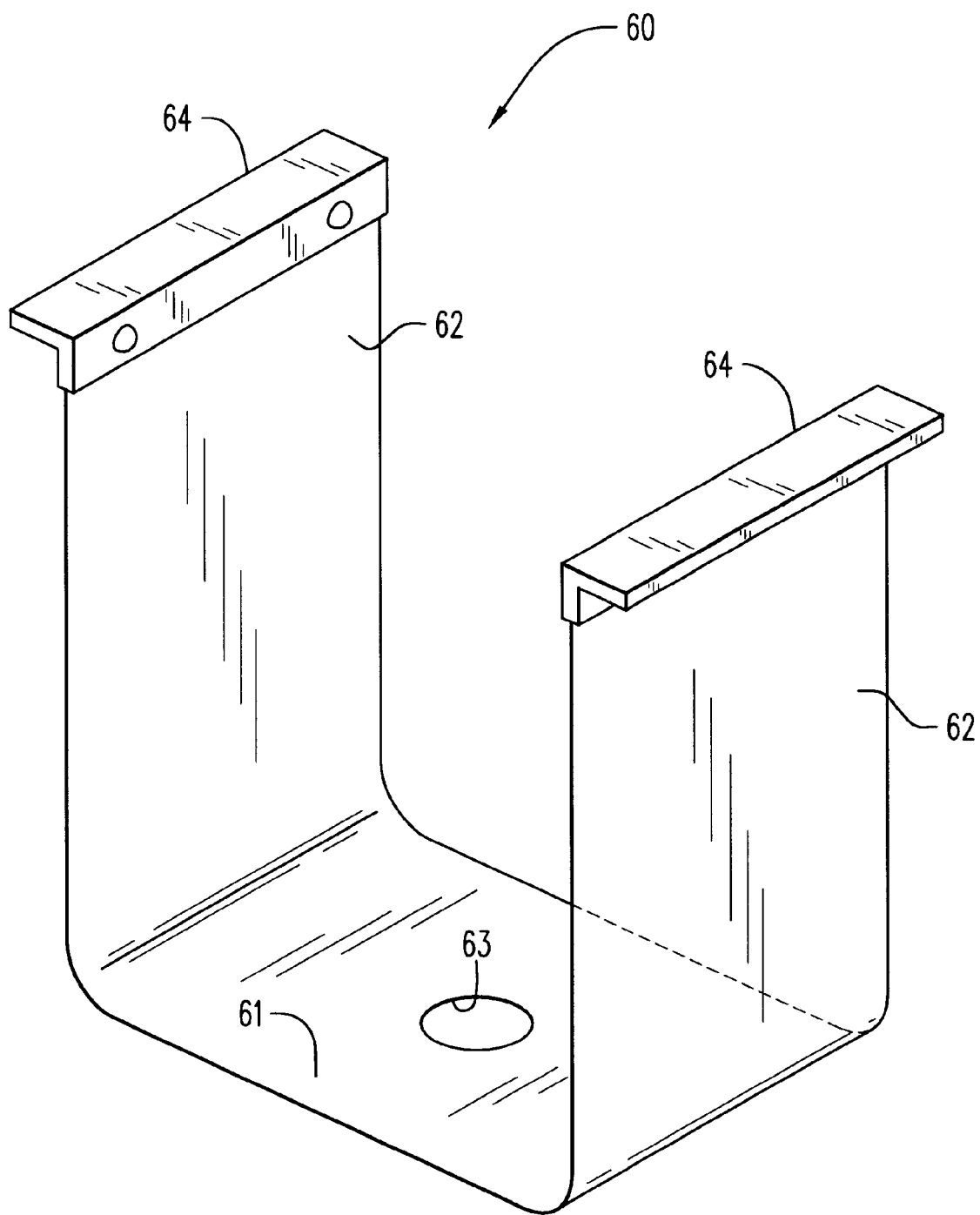
FIG. 4 shows a first embodiment of a removing device for baked product removal.

Referring to FIG. 4 in particular, the retrieving device comprises a base portion 61 and two arm portions 62. The base portion 61 comprises a rigid surface for receiving a baked product and is to be placed at the bottom of the baking container 40, that is, below the stirring-blade. Naturally the base-portion is preferably placed inside the baking container before ingredients are introduced. During the baking process, the bulk of the baked product will be formed above this base portion 61 since it is placed at the bottom of the baking container.

When the base portion is removed from the baking container after baking has been complete, the baked product would be simultaneously transported out of the container. To ensure smooth transportation of the baked product out of the baking container, this base portion should have a sufficiently large surface area and be rigid enough so that it would not be deformed by the weight of the baked product during its transportation.

In the preferred embodiment of FIG. 4, the base portion comprises a rigid plate having a non-stick coating. This portion extends from one side of the baking container, passing through the stirring-blade driving shaft 45, and reaching the other side of the container, thereby providing coverage of a substantial part of the bottom of the baking container. To allow passage of the base portion through the stirring-blade driving shaft in order to reach the baking container bottom, an aperture 63 is provided on the base portion for by-passing the shaft. Naturally, the aperture 63 must be shaped and positioned corresponding to the that of the shaft.

For a baking container having a removable stirring-blade, the blade would have to be removed before insertion of the base portion through the shaft and then re-installed afterwards. For a container having a non-removable blade, the base portion can be inserted through the blade and rest at the bottom of the baking container by having the aperture adapted to the foot-print of the stirring blade. It is of course necessary that the stirring blade and its driving shaft are designed so that the blade can freely rotate after the base portion has been placed below the blade.

While a rigid plate has been described in the present embodiment, it should be appreciated that the base portion need not be a solid plate, it can also be in the form of a net, mesh, crate, grille, slotted plate or other suitable structure as long as it is rigid enough to receive and support the baked product.

The arm portions 62 are provided more particularly for removing the base portion out of the baking container and also for placing the base portion into the baking container. In the present preferred embodiment, the arm portions comprises first and second rigid and elongated parts each extending from the edge of the base portion to beyond the top edge of the baking container. When the base portion is properly placed on the bottom of the baking container, the end of each arm portion would be situated in the space between the top-lid and the collar.

For minimal intrusion into the body of the baked product and thus minimising damage to its appearance, the arm portions preferably extend upwardly along and close to the walls of the baking container. The vertical part in FIG. 4 comprises a metal plate which is coated with a non-stick coating, it should be appreciated that this arm portion can also be a net-, mesh-, grille-type, slotted plate or other suitable types of structure as long as it is strong enough to support the base portion when loaded with the baked product.

Furthermore, this vertical part can also comprise a non-rigid but strong structure, such as a simple wire, as long as the handle of the arm portion can be located outside the baked product for retrieval, for example by a restraining means outside the baking container.

While the retrieving device can have rigid junctions between the arm portions and the base portion, it should be appreciated that a hinged junction can be used instead as shown in FIG. 4. Release of the baked product would be simple if a retrieving device having hinged junctions are used.

In addition, where a retrieving device is formed with a rigid junction, a single arm portion, instead of two, would be adequate provided the single arm portion is strong enough.

At the free end of an arm portion 62, there is provided a handle 64 which is preferably made of a thermal insulating material so that a user will not easily be burnt when unknowingly retrieving a freshly baked product. Preferably this handle 64 is located between the baking container and the covering lid after the base portion is properly placed inside the baking container. Alternatively, the handle 64 can also be provided with an angular portion for resting on or arresting the baking container edge when properly placed inside it.

The arm- and base-portions of the retrieving device are preferably made of a thermal conductive material so that heat may be evenly distributed, for example, by conducting the heat collected by the arm portions to the base portion. Preferably the arm- and base-portions are coated with a non-stick coating to minimise sticking of the baked product to the retrieving device.

While the present invention has been explained and illustrated with reference to the above embodiment, it should be appreciated this improved cake machine can also be realised by adapting the principles described herein and by utilising other similar or equivalent methods of construction.

I claim:

1. An automatic baking apparatus having a main housing and a non-removable baking container, wherein inside the main housing there are provided heating means, motor driving means and control means and inside the non-removable baking container there are provided stirring means and retrieving means, wherein said stirring means comprises a stirring-blade member which is engageable with said motor driving means for causing motion of said stirring-blade, said retrieving means is provided for removing a baked product from said baking container and comprises a base portion and an arm portion, said base portion being placed at the bottom of said baking container below said stirring-blade member and said arm portion extending from and being accessible from outside the body of said baked product.

2. A baking apparatus according to claim 1, wherein said base portion comprises an aperture which is adapted to allow passage of the driving shaft of said stirring-blade member through said base portion.

3. A baking apparatus according to claim 1, wherein said base portion comprises an aperture which is adapted to allow passage of said stirring-blade member through said base portion.

4. A baking apparatus according to claim 1, wherein said base portion comprises a rigid member extending from one side of said baking container, passing through the under-side of said stirring-blade member and reaching the other side of said baking container.

5. A baking apparatus according to claim 1, wherein said base portion comprises a rigid member which is in the form of a net, mesh, plate, grille, slotted plate or the like.

6. A baking apparatus according to claim 1, wherein said base portion and said arm portion are connected by a hinged joint.

7. A baking apparatus according to claim 1, wherein said arm portion comprises an elongated member which substantially extends from said base portion, along the wall of said baking container and beyond the top edge of said baking container.

8. A baking apparatus according to claim 1, wherein said arm and base portions of said retrieving device are completely received within the enclosure defined between said baking container and a lid covering said apparatus when said base portion is placed on the bottom of said baking container.

9. A baking apparatus according to claim 1, wherein said arm portion further comprises an insulating handle.

10. A baking apparatus according to claim 1, wherein said heating elements are attached to said baking container.

11. A retrieving device for an automatic baking apparatus, comprising base and arm portions, wherein said base portion comprises a rigid member which in use extends from one side of the bottom of a baking container of said apparatus, passing below the under-side of a stirring-blade member inside said container, and reaching the other side of said baking container, and said arm portion comprises a member which extends from said base portion upwardly towards an open end of said baking container, said retrieving device being removably mounted within said baking container.

12. A retrieving device according to claim 11, wherein said base portion comprises an aperture which is adapted to allow passage of a driving shaft of said stirring-blade member through said base portion.

13. A retrieving device according to claim 11, wherein said base portion comprises an aperture which is adapted to allow passage of said stirring-blade member through said base portion.

14. A retrieving device according to claim 11, wherein said base portion comprises a rigid member which is in the form of a net, mesh, plate, grille, slotted plate or the like.

15. A retrieving device according to claim 11, wherein said base portion and said arm portion are connected by a hinged joint.

* * * * *